(12) United States Patent
Sauder et al.

(10) Patent No.: US 9,408,337 B2
(45) Date of Patent: Aug. 9, 2016

(54) AGRICULTURAL ROW UNIT APPARATUS, SYSTEMS AND METHODS

(75) Inventors: Derek A. Sauder, Tremont, IL (US); Timothy A. Sauder, Tremont, IL (US)

(73) Assignee: Precision Planting LLC, Tremont, IL (US)

(*) Notice: Subject to any disclaimer, the term of this patent is extended or adjusted under 35 U.S.C. 154(b) by 28 days.

(21) Appl. No.: 14/122,622

(22) PCT Filed: Jun. 4, 2012

(86) PCT No.: PCT/US2012/040729
§ 371 (c)(1),
(2), (4) Date: Nov. 26, 2013

(87) PCT Pub. No.: WO2012/167244
PCT Pub. Date: Dec. 6, 2012

(65) Prior Publication Data
US 2014/0090585 A1   Apr. 3, 2014

Related U.S. Application Data

(60) Provisional application No. 61/493,200, filed on Jun. 3, 2011.

(51) Int. Cl.
*A01B 5/04* (2006.01)
*A01B 49/02* (2006.01)
(Continued)

(52) U.S. Cl.
CPC .............. *A01B 5/04* (2013.01); *A01B 49/027* (2013.01); *A01B 49/06* (2013.01); *A01C 5/064* (2013.01); *A01C 5/068* (2013.01)

(58) Field of Classification Search
CPC ............ A01B 5/04; A01B 5/00; A01B 49/06; A01B 49/04; A01B 49/00; A01B 49/027; A01B 49/02; A01C 5/068; A01C 5/066; A01C 5/06; A01C 5/00; A01C 5/064; A01C 5/062

See application file for complete search history.

(56) References Cited

U.S. PATENT DOCUMENTS 2,691,353 A  10/1954 Secondo
5,398,771 A  3/1995 Hornung et al.
(Continued)

FOREIGN PATENT DOCUMENTS

NL    1026443 C     2/2006
WO    2004004437 A1 1/2004
WO    2006096072 A1 9/2006

OTHER PUBLICATIONS

Great Plains Manufacturing, Parts Manual Discovator (Disc and Coulter) Series VII, Feb. 12, 2009, Salina, KS (available at http://www.greatplainsmfg.com/manuals/pdf/550-220p.pdf).

*Primary Examiner* — Christopher J Novosad
(74) *Attorney, Agent, or Firm* — Thomas J. Oppold; Larkin Hoffman Daly & Lindgren, Ltd.

(57) ABSTRACT

An agricultural row unit apparatus, systems, methods for effectively creating a trench having an improved configuration and for improved product placement in or near the trench wherein the trench has a vertical sidewall and an angled sidewall. In some embodiments, a cavity is created adjacent the bottom of the trench. In some embodiments, the depth of the trench is maintained by a gauge wheel compacting soil adjacent to the angled sidewall. In some embodiments, fertilizer or other liquid or crop input is placed in the soil on the side of the trench opposite the gauge wheel. In some embodiments, two trenches each having a vertical sidewall and an angled sidewall are created by a single row unit.

20 Claims, 17 Drawing Sheets

(51) Int. Cl.
*A01B 49/06* (2006.01)
*A01C 5/06* (2006.01)

(56) References Cited

U.S. PATENT DOCUMENTS

| | | |
|---|---|---|
| 5,462,124 A | 10/1995 | Rawson |
| 5,819,855 A | 10/1998 | Tarver, III |
| 5,957,217 A | 9/1999 | Gunnink |
| 6,213,035 B1 | 4/2001 | Harrison |
| 6,332,413 B1 | 12/2001 | Stufflebean |
| 6,578,502 B1 | 6/2003 | Barnstable |
| 8,074,730 B2 | 12/2011 | Kovach |
| 2007/0044694 A1 | 3/2007 | Martin |
| 2009/0025618 A1 | 1/2009 | Bassett et al. |
| 2010/0282147 A1 | 11/2010 | Wollenhaupt et al. |
| 2011/0000408 A1 | 1/2011 | Martin |
| 2011/0005439 A1 | 1/2011 | Patwardhan et al. |

US 9,408,337 B2

AGRICULTURAL ROW UNIT APPARATUS, SYSTEMS AND METHODS

CROSS-REFERENCE TO RELATED APPLICATIONS

This application claims the benefit of U.S. Provisional Application No. 61/493,200 filed Jun. 3, 2011.

BACKGROUND

In some methods of applying seed or other crop inputs to a field, a trench is opened for introduction of the crop input or inputs. In many applications, the configuration of the trench is agronomically important. Thus there is a need in the art for systems, methods and apparatus for effectively creating a trench having an improved configuration, as well as for improved product placement in or near the trench.

DETAILED DESCRIPTION

Overview

Figure 1:
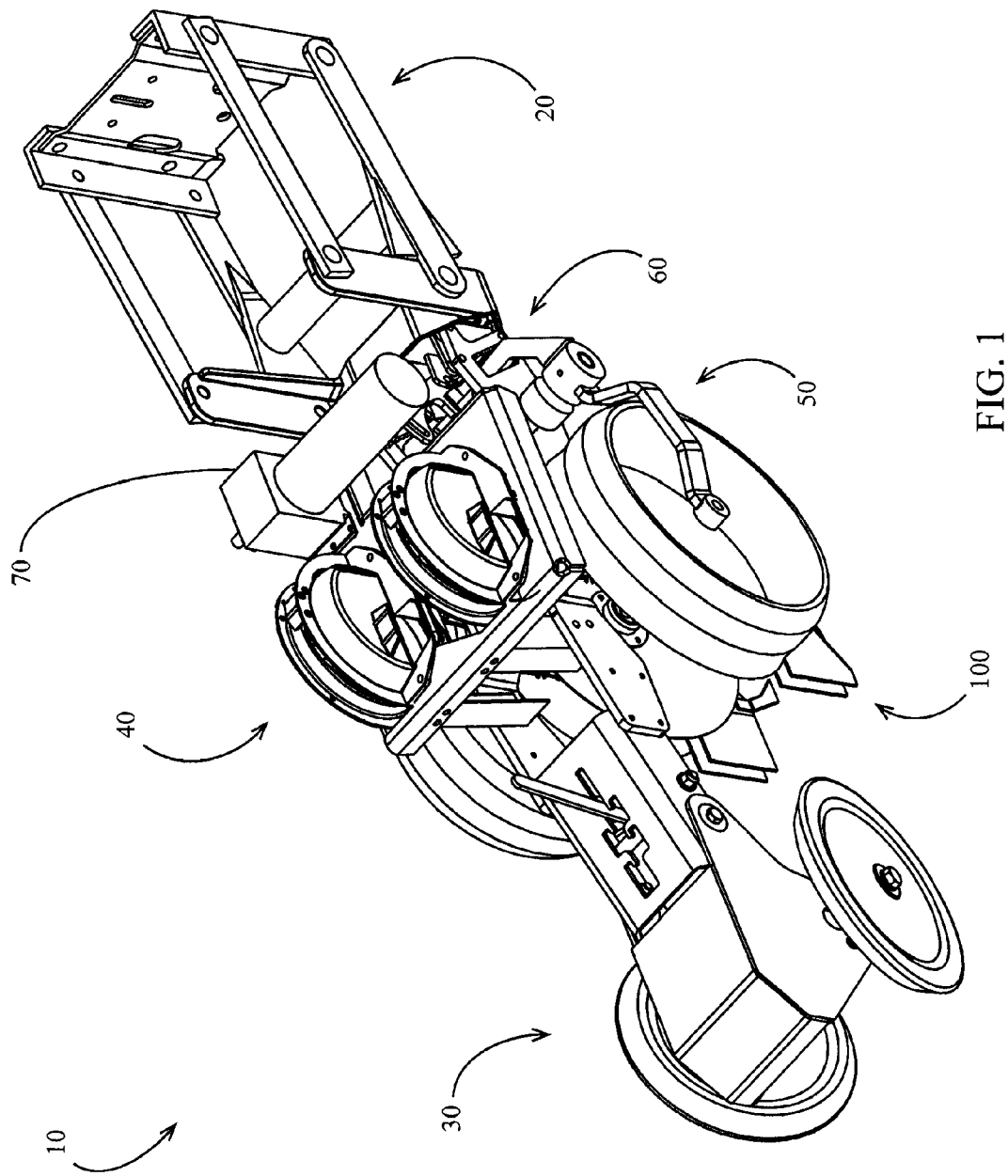
FIG. 1 is a rearward perspective view of an embodiment of an agricultural row unit.
Figure 2:
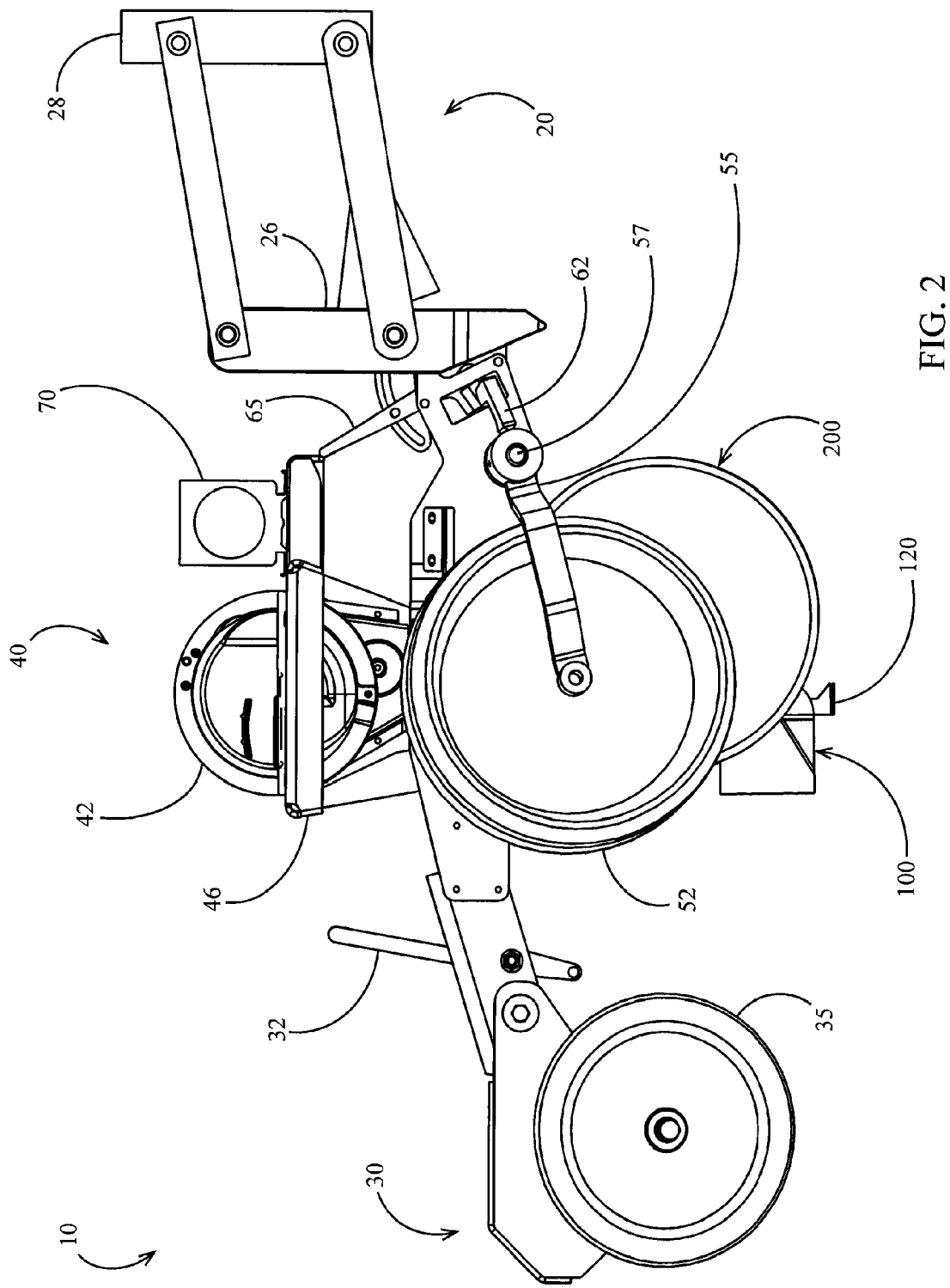
FIG. 2 is a side elevation view of the agricultural row unit of FIG. 1.

Referring now to the drawings, wherein like reference numerals designate identical or corresponding parts throughout the several views, FIG. 1 is a perspective view of an agricultural row unit 10. The row unit 10 is attached to a tractor-drawn toolbar by a mounting assembly 20, which preferably comprises a set of parallel arms pivotally connecting a forward bracket 28 to a rearward bracket 26 (FIG. 2). Row unit 10 preferably includes a meter assembly 40, a depth adjustment assembly 60, gauge wheel assemblies 50, seed tube assemblies 100, opener disc assemblies 200 (FIG. 2), and closing assembly 30. Row unit 10 also preferably includes a row-unit mounted motor 70.

Figure 4:
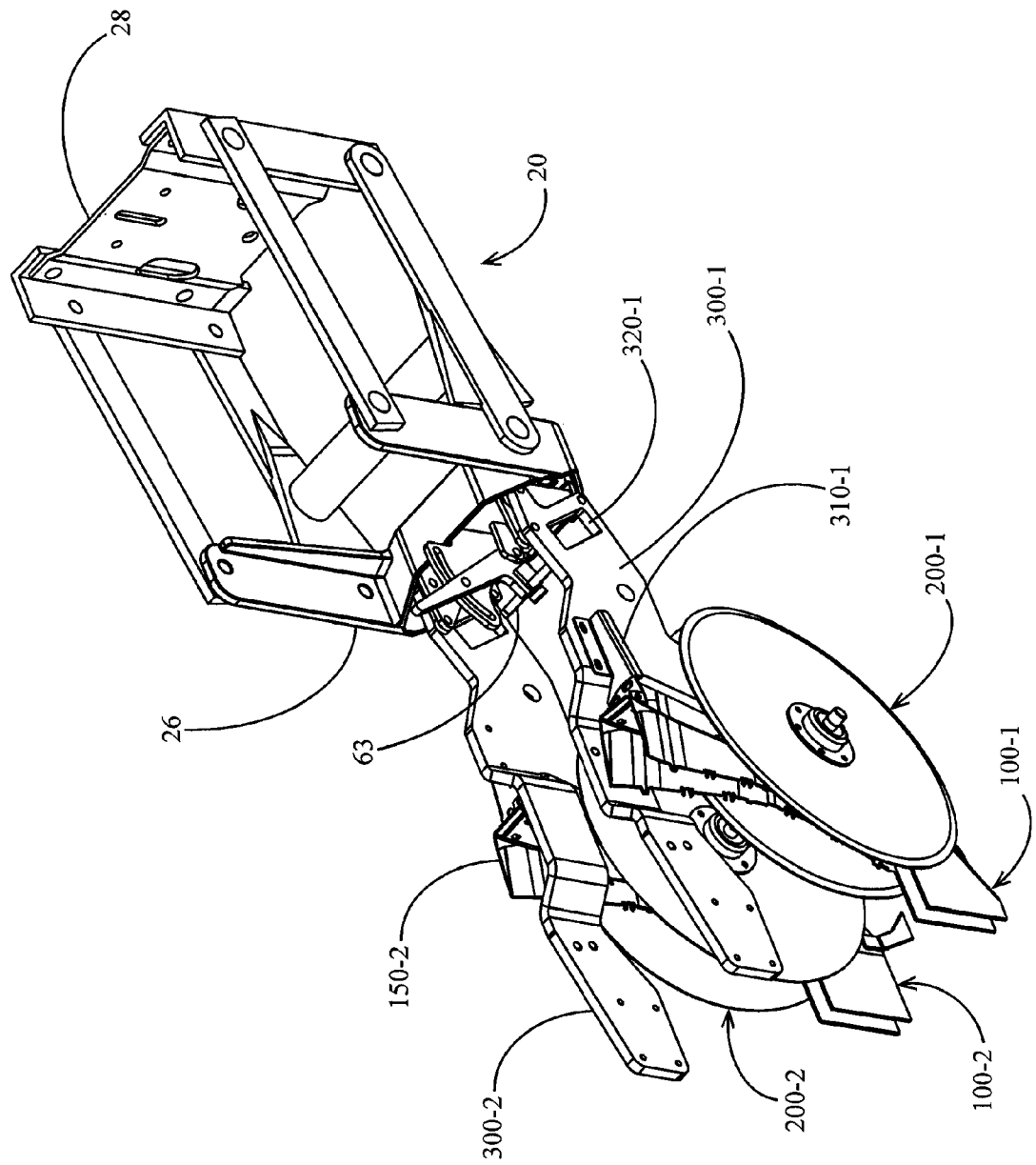
FIG. 4 is a rearward perspective view of the agricultural row unit of FIG. 1 with some components removed for clarity.
Figure 6:
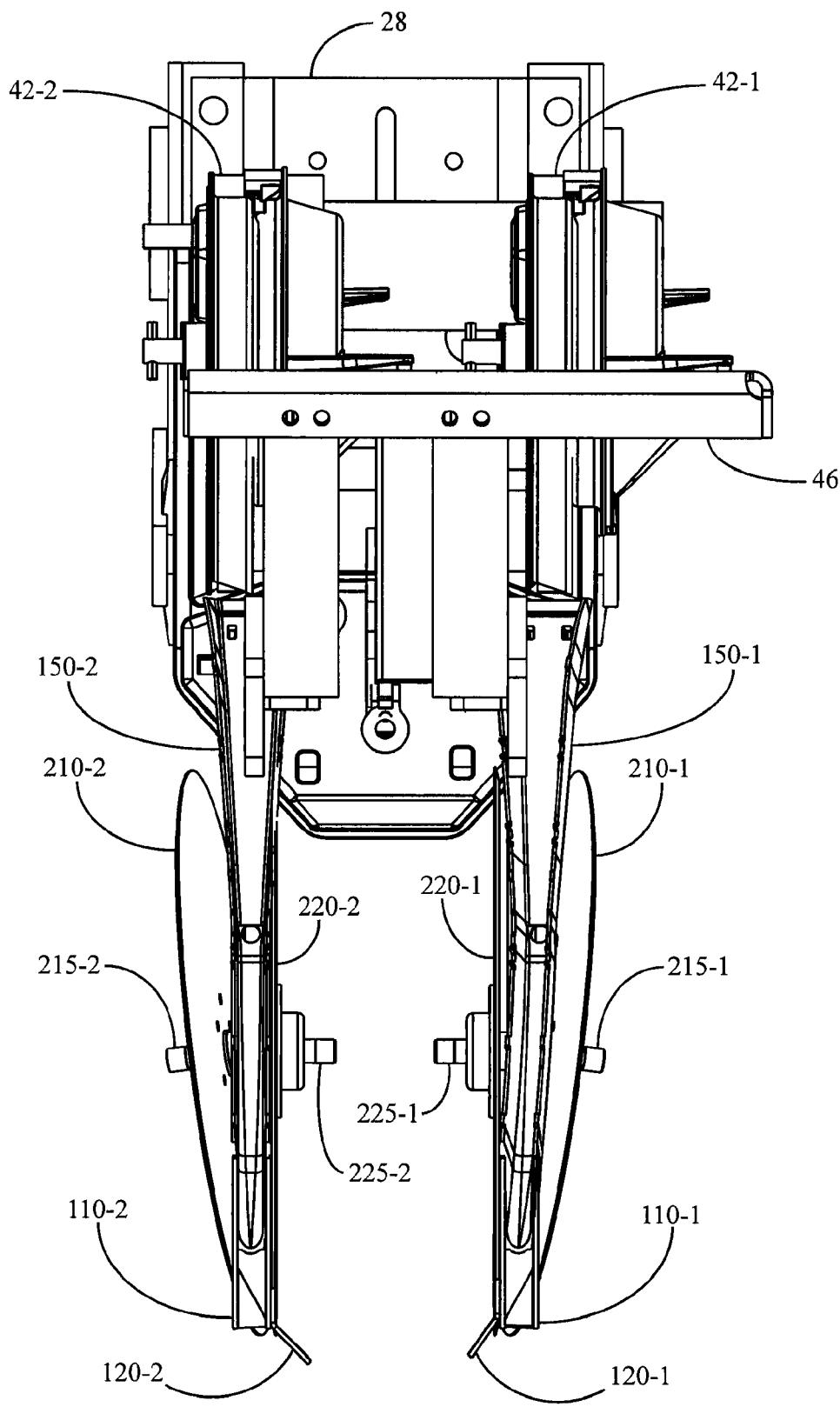
FIG. 6 is a rear elevation view of the agricultural row unit of FIG. 1 with some components removed for clarity.

Referring to FIGS. 2 and 6, the meter assembly 40 includes a first meter 42-1 and a second meter 42-2 supported by a meter frame 46 on the row unit 10. As best illustrated in FIG. 4, the opener disc assemblies 200 each open a distinct trench in the soil disposed beneath each meter 42. Each meter may comprise any metering device adapted to dispense crop inputs. In some embodiments, the seed meters 42 comprise vacuum-type seed meters. The motor 70 is preferably adapted to drive the meters 42 via a mechanical connection (not shown) with at least one of the meters; the operation of the meters 42 is preferably tied by a mechanical connection (not shown) such as a shaft connecting the seed discs of the meters. In other embodiments, the motor 70 is replaced with another meter driving mechanism such as a hydraulic drive or ground drive; in some embodiments the meter driving mechanism is mounted to the toolbar drawing the row unit 10.

Figure 5:
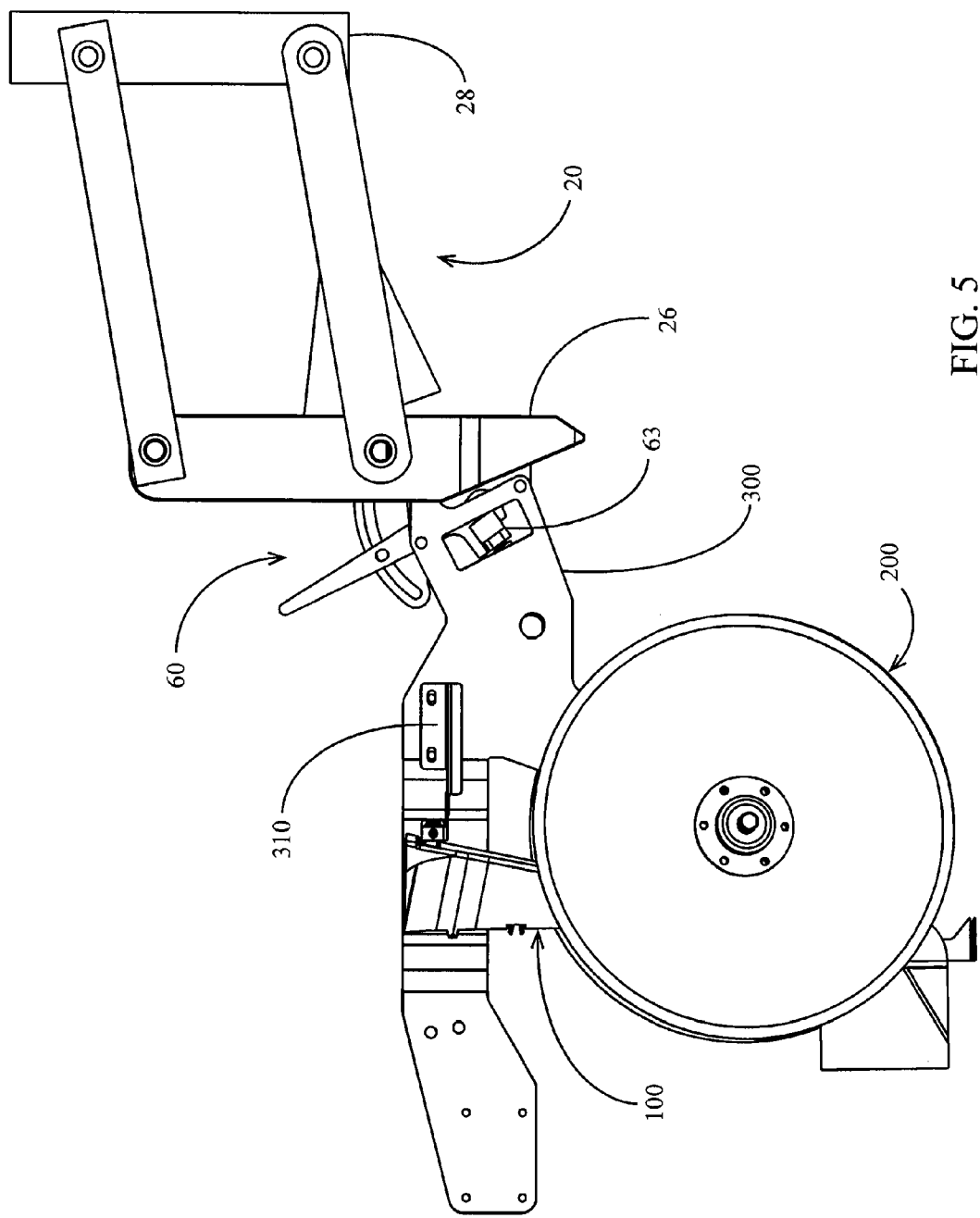
FIG. 5 is a side elevation view of the agricultural row unit of FIG. 1 with some components removed for clarity.
Figure 7:
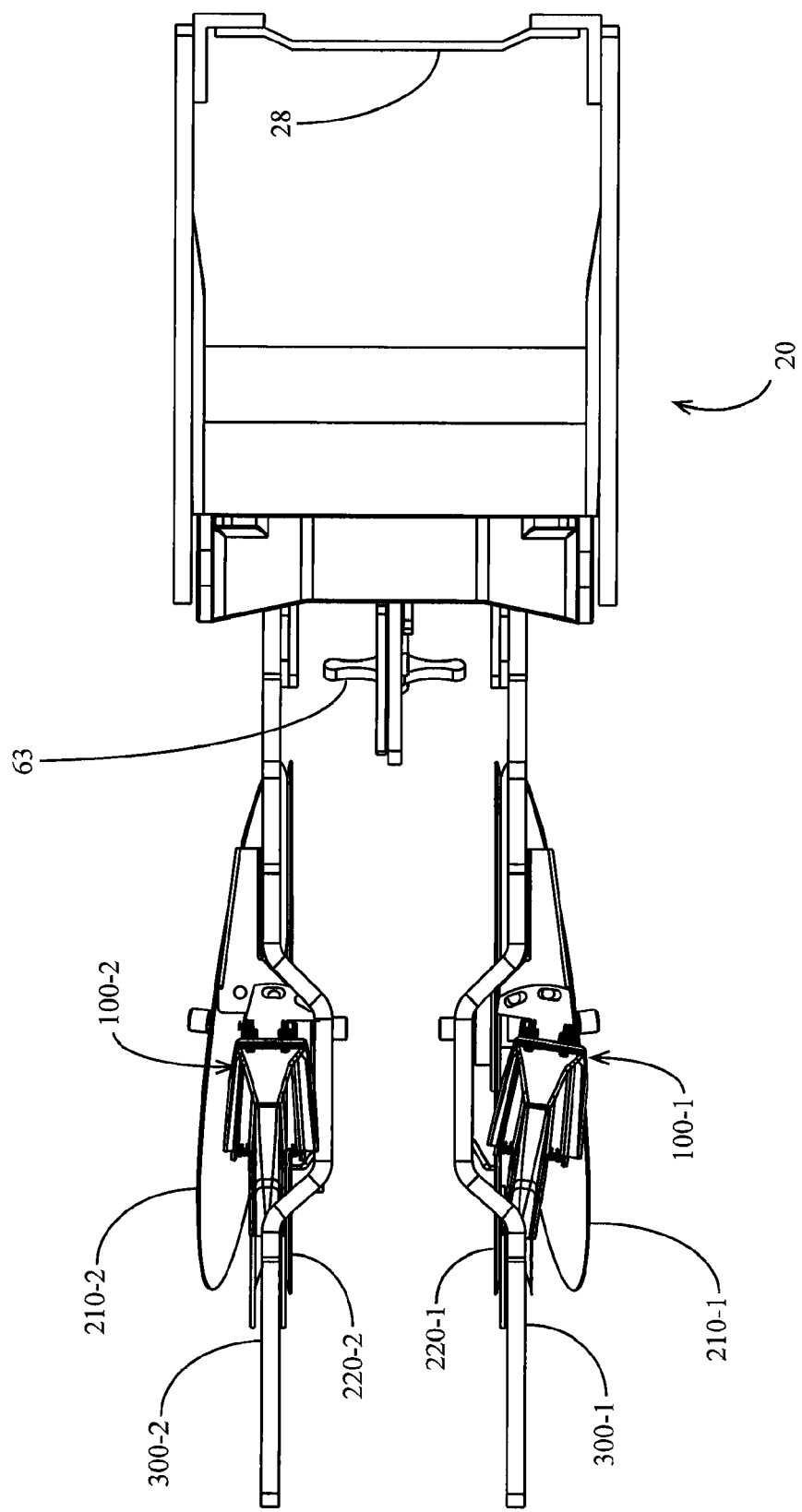
FIG. 7 is a top view of the agricultural row unit of FIG. 1 with some components removed for clarity.
Figure 8:
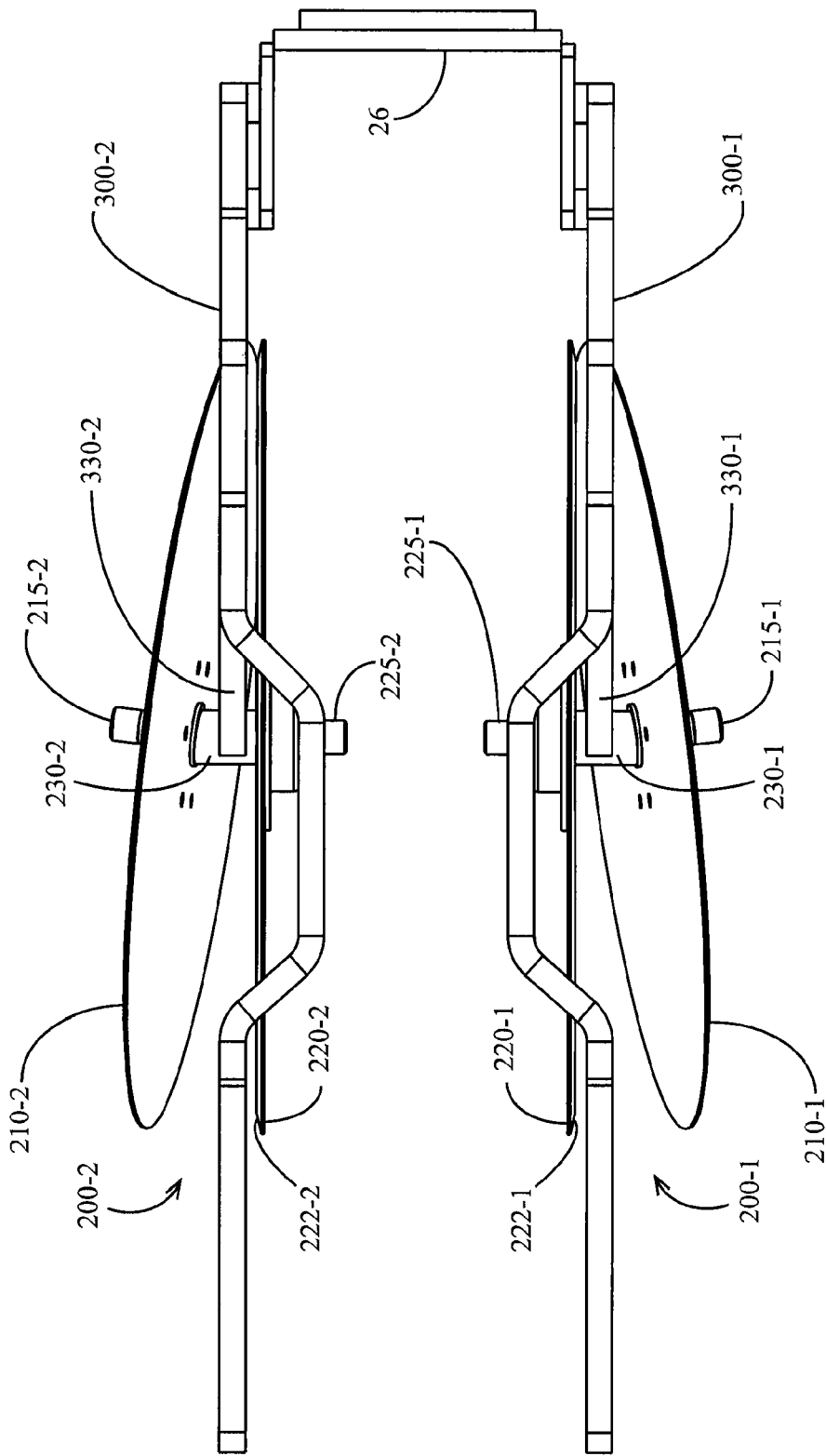
FIG. 8 is a partial top view of the agricultural row unit of FIG. 1 with some components removed for clarity.
Figure 9:
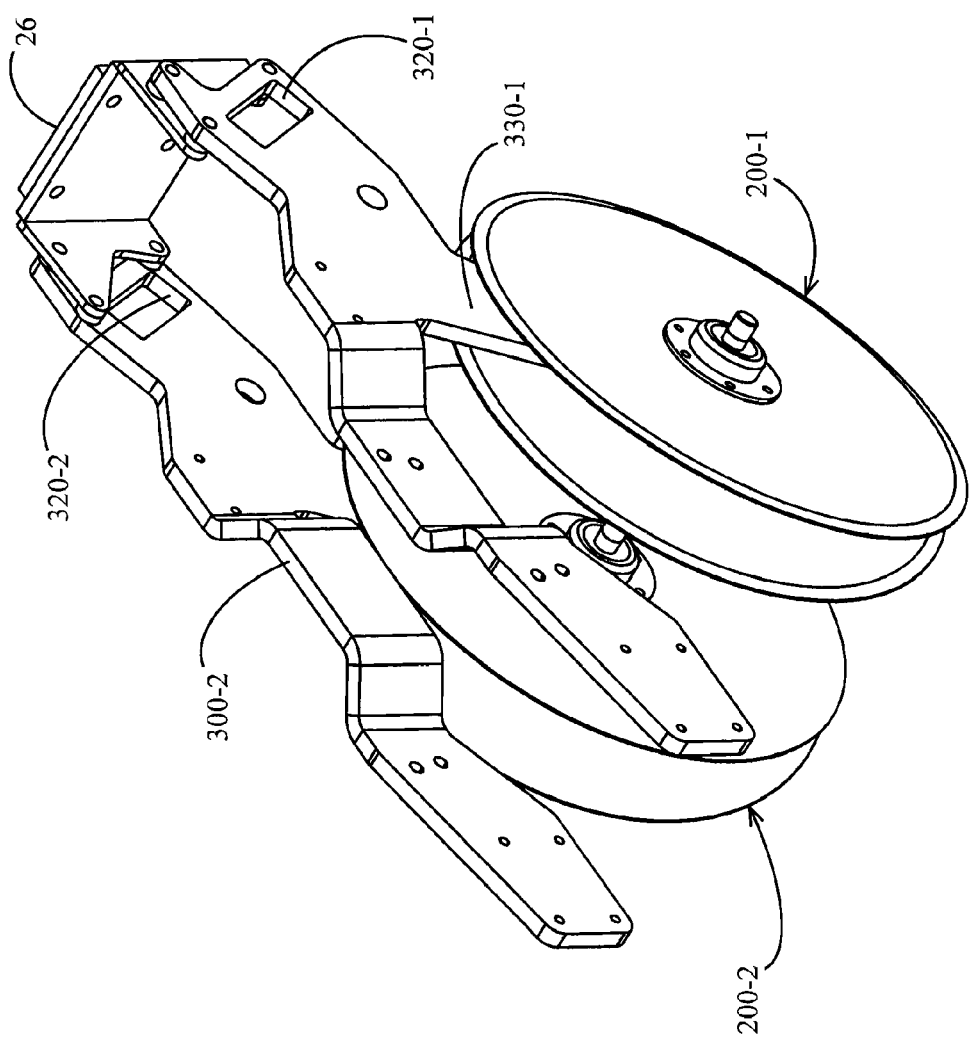
FIG. 9 is a partial rear perspective view of the agricultural row unit of FIG. 1 with some components removed for clarity.

As best illustrated in FIGS. 4, 5 and 7, the row unit 10 includes mounting plates 300 attached to the rearward bracket 26. Each seed tube assembly 100 is mounted to the associated mounting plate 300 by a mounting bracket 310. As best illustrated in FIGS. 8 and 9, each mounting plate 300 includes a downwardly extending portion 330 to which each opener disc assembly 200 is mounted by a threaded boss 230.

Figure 3:
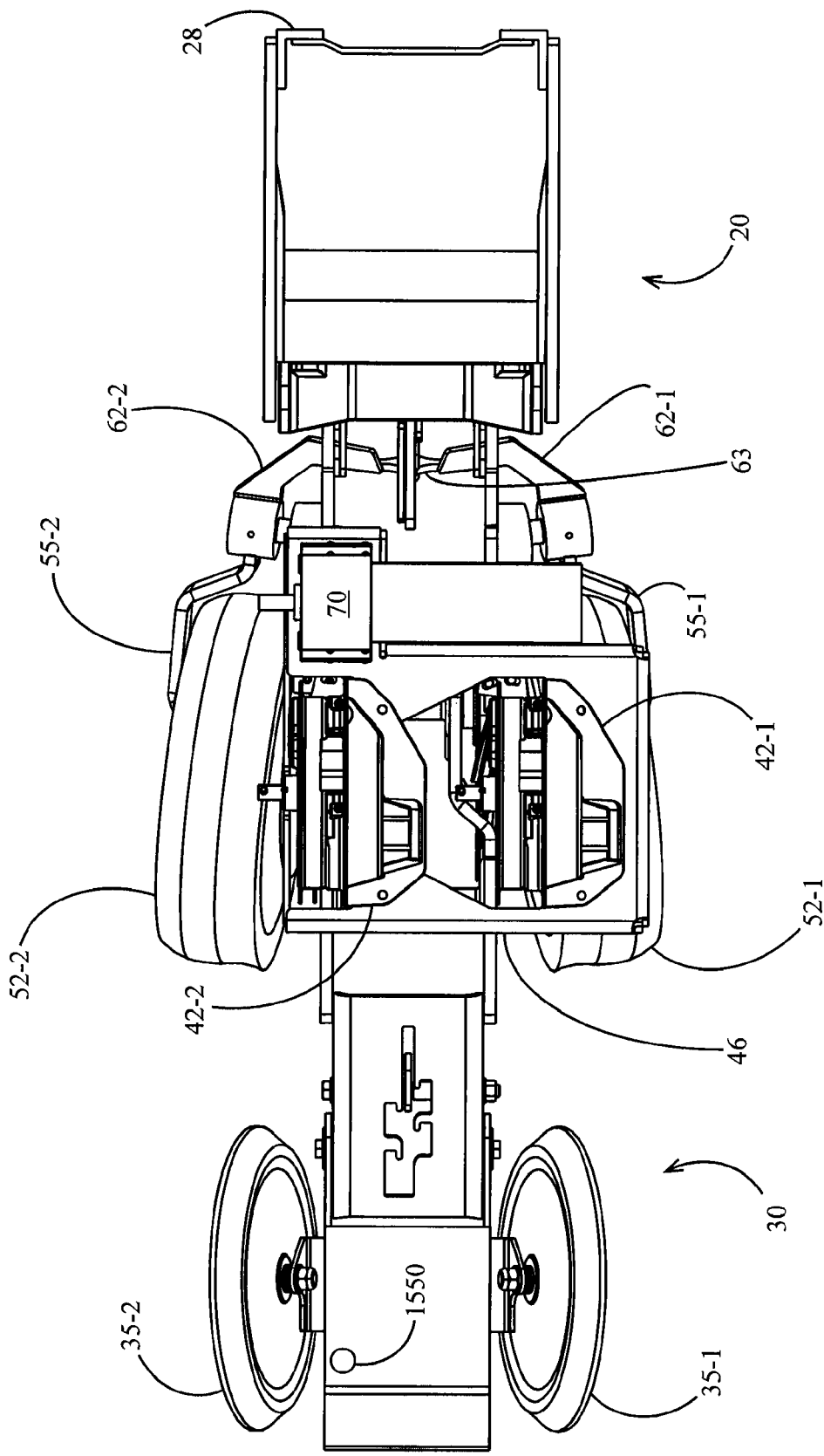
FIG. 3 is a top view of the agricultural row unit of FIG. 1.

Turning to FIG. 6, each seed tube assembly 100 includes a seed tube 150 defining a seed path from each seed meter 42 to the trench created by the associated opener disc assembly 200. Each seed tube assembly 100 preferably includes a seed tube guard 110 mounted to the downwardly extending portion 330. The seed tube guard 110 preferably extends beneath the seed tube 150 to protect the seed tube 150 from contact with the ground. The seed tube guard 110 preferably extends to either side of the seed tube 150 to protect the seed tube 150 from contact with the opener disc assembly 200. Closing assembly 30 includes closing wheels 35 disposed behind each seed tube 150 and configured to close the trench created by the associated opener disc assembly (FIG. 3).

In operation, as the planter traverses the field, the meters 42 deposit seeds through the seed tubes 150 into the trench opened by the associated opener disc assembly 200. The associated closing wheel 35 then closes the trench.

The depth of the trenches created by the opener disc assemblies 200 is set by the height of gauge wheel assemblies 50 (FIG. 1) relative to the opener disc assemblies 200. As best illustrated in FIG. 2, each gauge wheel assembly 50 includes a gauge wheel 52 pivotally mounted to a gauge wheel arm 55. Gauge wheel arm 55 is preferably pivotally mounted to the row unit 10 about a pivot 57. Gauge wheel arm 55 includes a depth-setting portion 62. The depth-setting portion 62 extends through an opening 320 (FIG. 4) in the mounting plate 300. As best illustrated in FIG. 3, the height of the depth-setting portions 62-1,62-2 of the gauge wheel arm assemblies 50 are lower-limited by a rocker 63 pivotally mounted to the row unit 10.

In operation, the gauge wheels 52 rollingly engage the soil and each opener disc assembly 200 opens a trench having a depth equal to the vertical offset between the bottom of gauge wheel 52 the bottom of the associated opener disc assembly 200. The vertical offset is set by the vertical position of rocker 63, which may preferably be adjusted using an adjustment arm 65 (FIG. 2). When, for example, the right gauge wheel 52-1 encounters an obstruction or change in terrain forcing the right gauge wheel upward, the right gauge wheel arm 55-1 will rotate clockwise about pivot 57 (as viewed along the perspective of FIG. 2), forcing the rocker 63 to pivot and thus forcing the other gauge wheel arm 55-2 to rotate and move the gauge wheel 52-2 downward. It should be appreciated that when a first gauge wheel 52 encounters an obstruction requiring the gauge wheel to raise by a height H relative to the soil, the second gauge wheel will lower by a height H/2 to raise the entire row unit by H/2 such that the first gauge wheel need only raise by H/2. Thus by incorporating the rocker 63, the depth adjustment assembly 60 advantageously divides by a factor of two the vertical displacement of row unit 10 caused by each obstruction.

The closing wheel assembly 30 preferably includes a downpressure adjustment arm 32 allowing a user to adjust the downpressure on the closing wheels 30 as disclosed in U.S. Pat. No. 5,676,073, the disclosure of which is hereby incorporated herein in its entirety by reference.

The illustrated embodiments of row unit 10 described herein include two sets of meters 42, opener disc assemblies 200 and seed tube assemblies 100 attached to a toolbar by a single mounting assembly 20. This is advantageous for narrow-row applications, as well as twin-row applications in which seeds deposited by meters 42-1 and 42-2 are timed in order to achieve a checkered pattern as described in U.S. patent application Ser. No. 12/645,789, the disclosure of which is hereby incorporated herein in its entirety by reference. However, in other embodiments a single meter, opener disc assembly and seed tube assembly are included in the row unit 10. In such embodiments the spacing between rows is determined by the transverse spacing of individual row units 10 along the toolbar. In such embodiments, a single closing wheel 35 preferably follows the seed tube assembly.

Opener Disc Assemblies

Figure 10B:
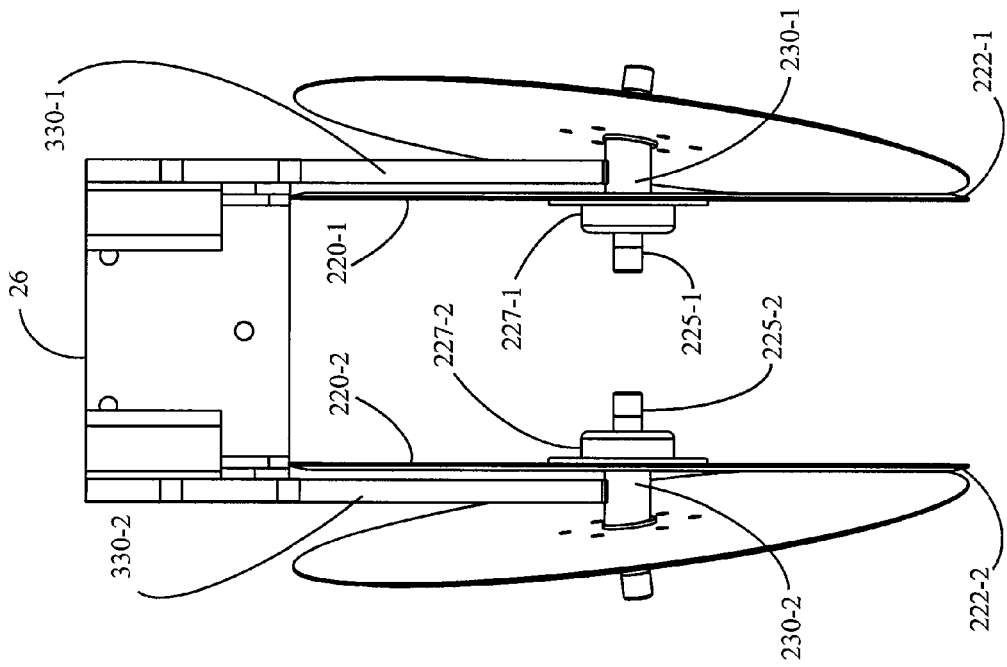
FIG. 10B is a partial rear elevation view of the agricultural row unit of FIG. 1 with some components removed for clarity.
Figure 10A:
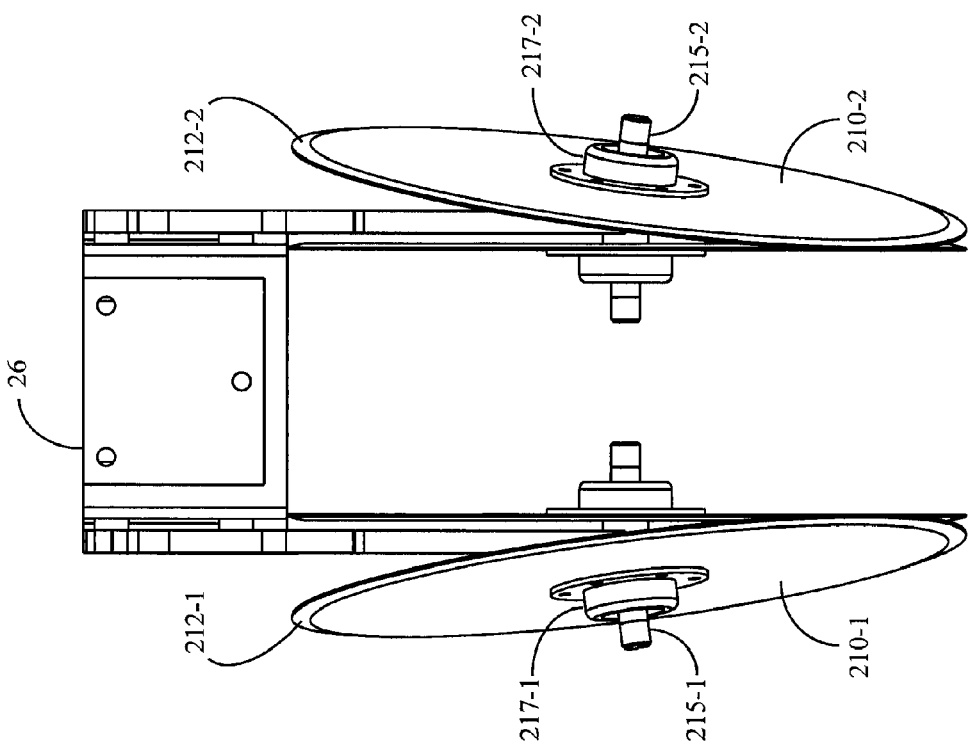
FIG. 10A is a partial front elevation view of the agricultural row unit of FIG. 1 with some components removed for clarity.

Referring to FIGS. 8, 10A and 10B, each opener disc assembly 200 includes an outer disc 210 and an inner disc 220. The outer disc 210 and the inner disc 220 are preferably adjacent one another. The outer disc 210 includes a bearing housing 217 which rotates about a stud 215. Stud 215 is received in a threaded cavity 216 (compare FIG. 11A with FIG. 11B) in threaded bearing 230. Thus the outer disc 210 rotates about an axis defined by the orientation of stud 215. The inner disc 220 includes a bearing housing 227 which rotates about a stud 225. Stud 225 is received in a threaded cavity 226 (compare FIG. 11A with FIG. 11B) in threaded bearing 230. Thus the inner disc 220 rotates about an axis defined by stud 225.

It should be appreciated in light of this disclosure that the relative orientation of opener discs 210,220 defines the dimensions of the trench created by the opener disc assembly 200. As best illustrated in FIGS. 10A and 10B, in a preferred embodiment, the inner disc 220 is oriented vertically with respect to the ground. In other words, the axis of rotation of inner disc 220 is preferably oriented horizontally with respect to the ground.

Figure 11A:
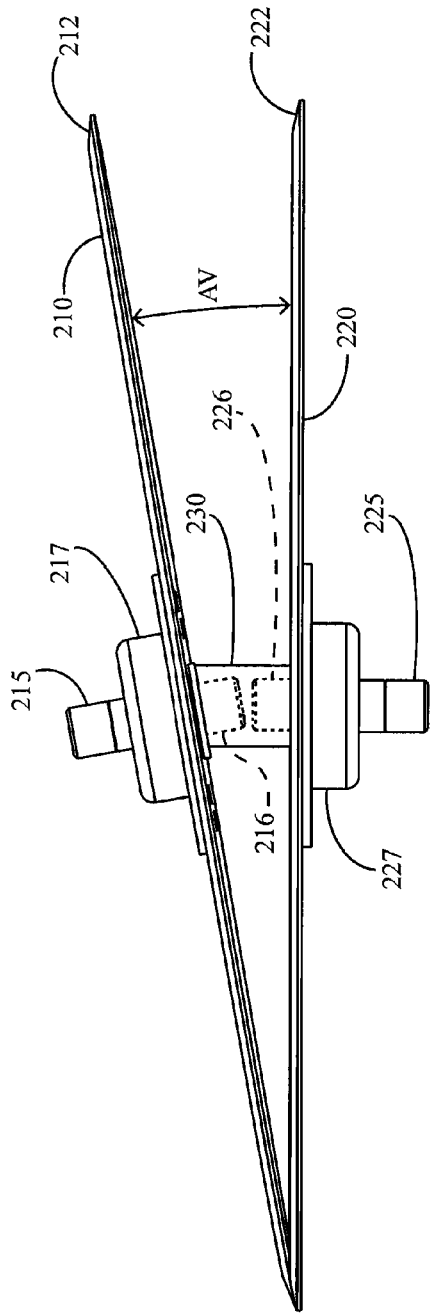
FIG. 11A illustrates an embodiment of an opener disc assembly as well as a relative angle of the opener discs of the opener disc assembly.
Figure 11B:
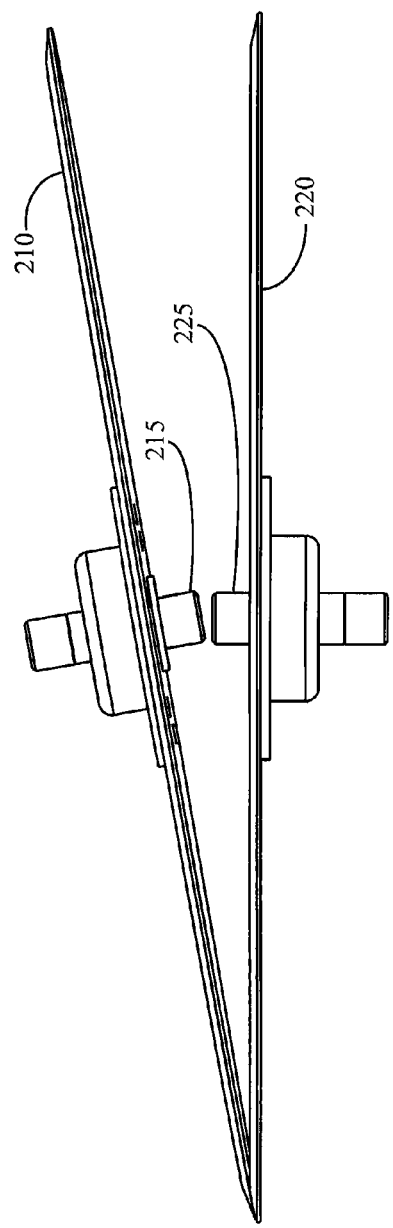
FIG. 11B illustrates the opener disc assembly of FIG. 11A.

As best illustrated in FIG. 11A, outer disc 210 contacts inner disc 220 at a contact area near a perimeter of the inner disc and near an perimeter of the outer disc. It should be appreciated that as the discs 210,220 rotate, the contact area remains in the same location. The outer disc 210 is offset from the inner disc 220 by an offset angle AV. As the angle AV is increased, the angle of the trench 1500 (FIG. 14B) opened by the opener disc assembly 200 increases. In a preferred embodiment, the angle AV is 10 degrees.

Figure 12B:
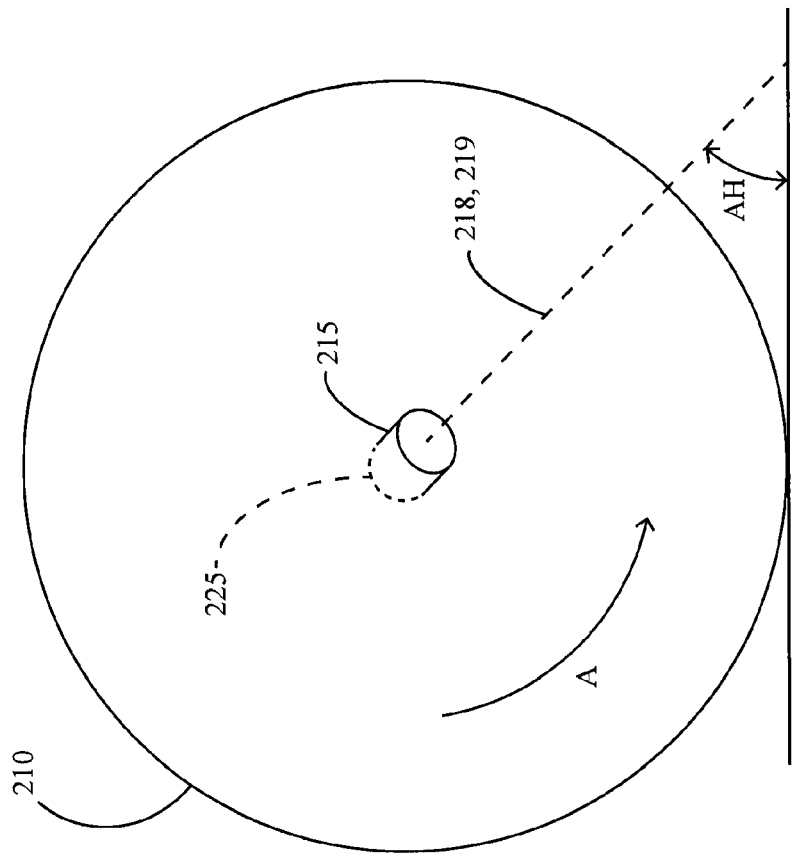
FIG. 12B is a schematic side elevation view of the opener disc assembly of FIG. 11A.
Figure 12A:
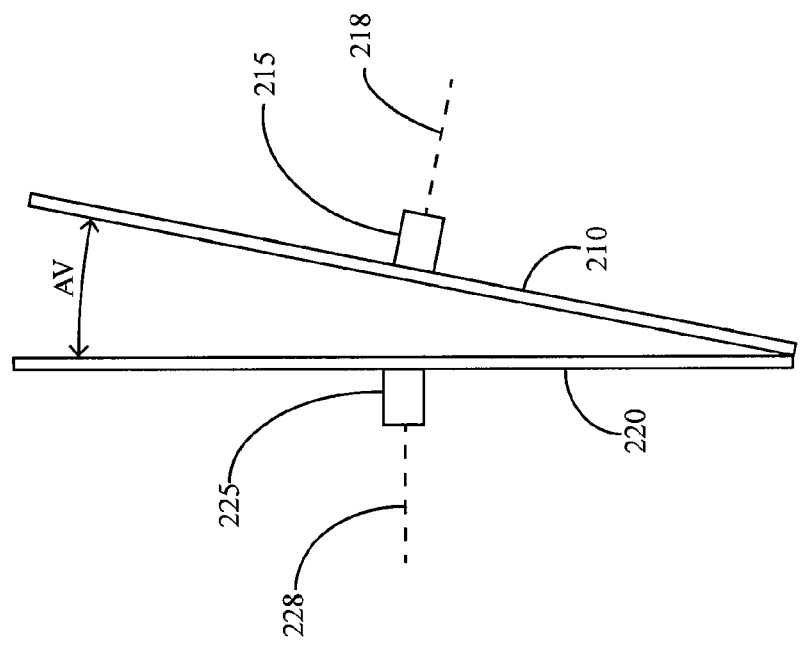
FIG. 12A is a schematic rear elevation view of an embodiment of the opener disc assembly of FIG. 11A.

FIG. 12A illustrates the angle AV schematically as determined by the angle between an axis 228 defined by stud 225 and an axis 218 defined by stud 215. FIG. 12B is viewed from the side of outer disc 210 along the axis 228. As seen in FIG. 12B, the axis 218 of stud 215 may be adjusted along the direction indicated by arrow A. This adjustment controls the location of the point of contact between the discs 210,220.

Figure 13:
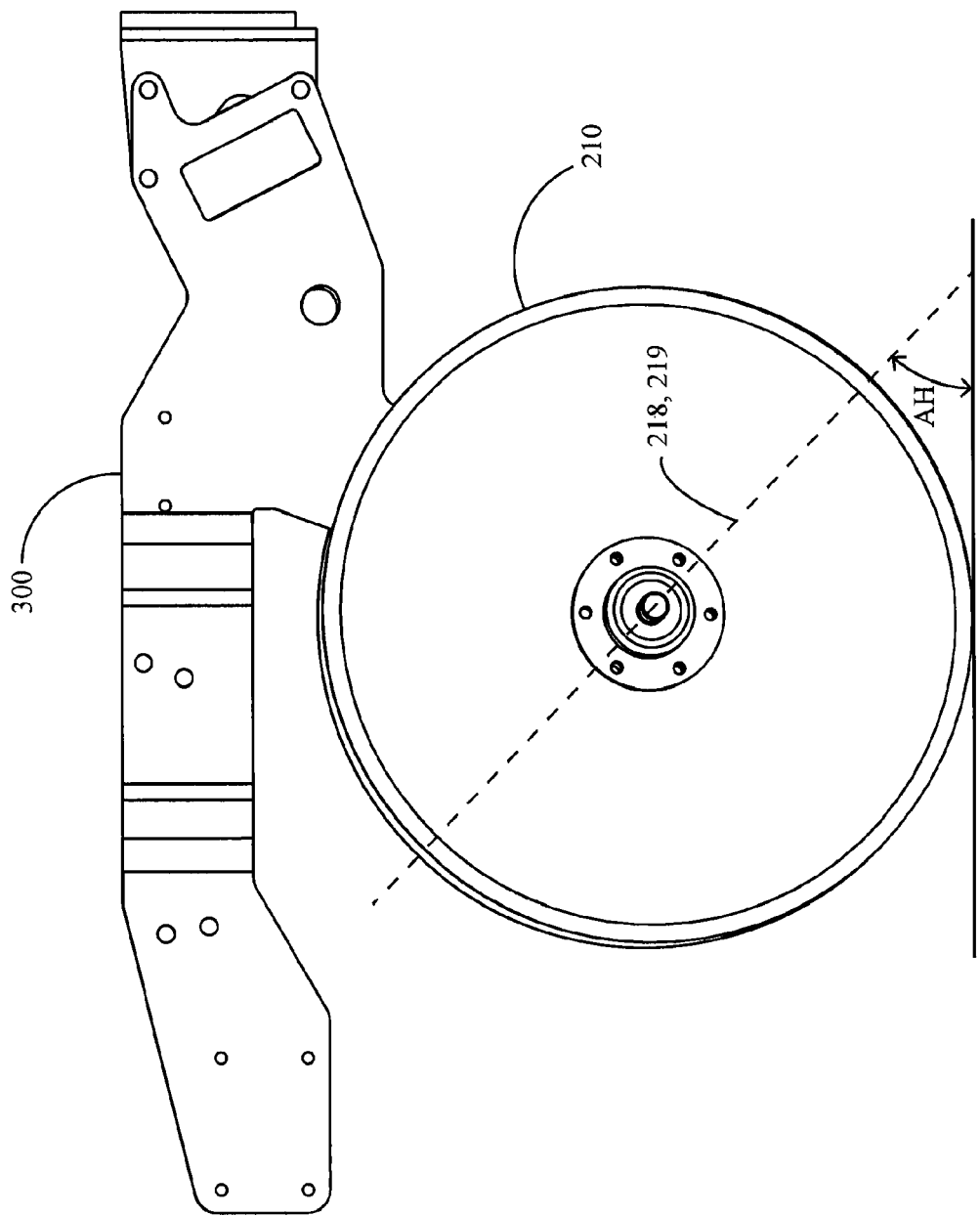
FIG. 13 is a partial side elevation view of the agricultural row unit of FIG. 1 with some components removed for clarity, further illustrating an angle of orientation of the opener disc assembly of the agricultural row unit.

As illustrated in FIGS. 12B and 13, the axis 218 lies in a plane 219 that intersects the area of contact between the discs and the ground. The plane 219 lies at an angle AH from the horizontal. Once a preferred angle AV is set between the discs for a desired trench angle, the orientation of axis 218 is preferably adjusted as illustrated in FIG. 12B to obtain the desired angle AH. The angle AH is preferably chosen such that the discs 210,220 enter the soil at approximately the area of contact between the discs; it should be appreciated that the discs enter the soil at an area forward of the centers of the discs 210,220. In a preferred embodiment, the angle AH is 45 degrees.

Opener Discs

As illustrated in FIG. 8 and FIGS. 10A-11B, in embodiments in which the inner disc 220 is substantially vertical, the inner disc preferably includes a bevel 222 around or near the perimeter of the disc. The bevel 222 improves the ability of the inner disc 220 to penetrate the soil.

Figure 16A:
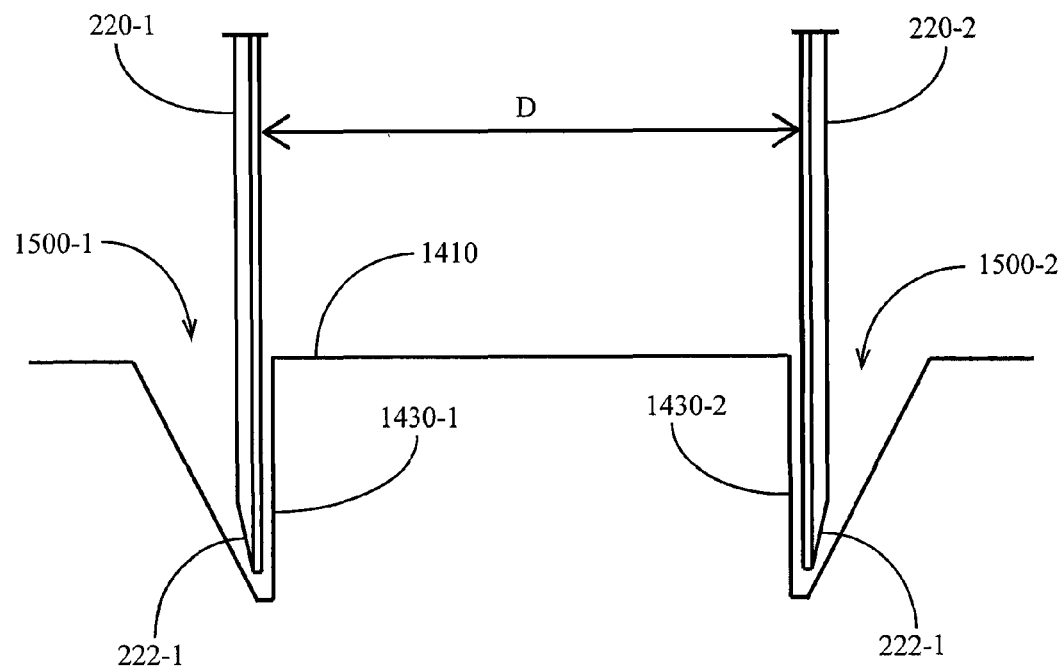
FIG. 16A is a front elevation view of trenches formed by the agricultural row unit of FIG. 1.
Figure 16B:
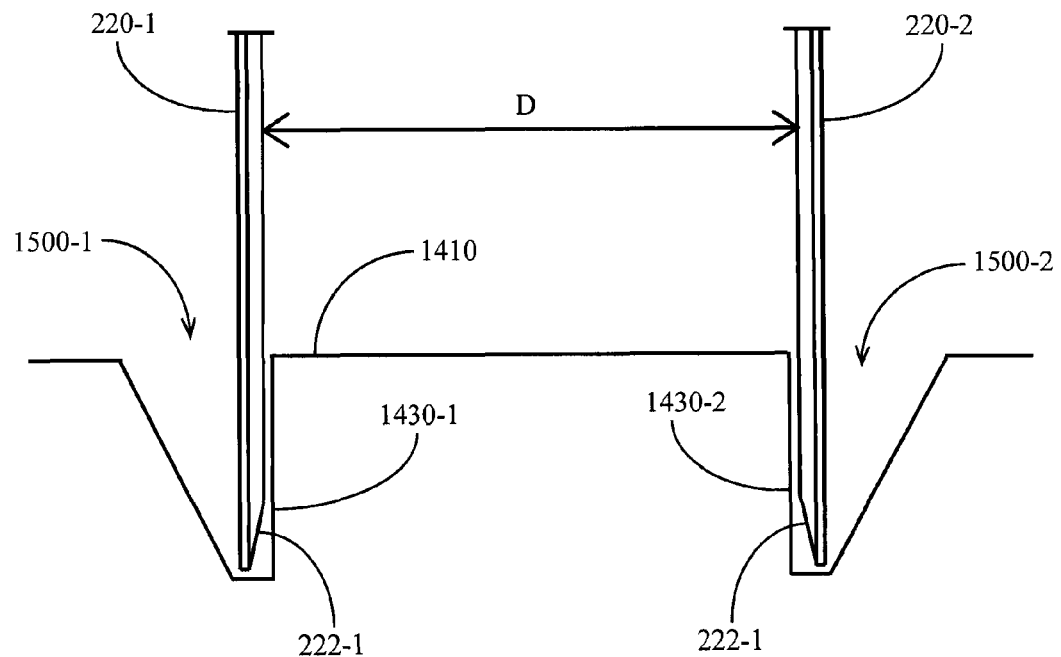
FIG. 16B is a front elevation view of trenches formed by another embodiment of an agricultural row unit.

In a preferred embodiment, the face of the bevel 222 is oriented toward the outer disc 212. This orientation of bevel 222 is beneficial particularly in embodiments in which two opener disc assemblies are mounted near one another, such as in twin row applications. As illustrated in FIGS. 16A and 16B, in a twin-row embodiment a distance D between the inner discs 220 may be approximately six inches. Under such circumstances, if the bevels 222 face one another as illustrated in FIG. 16B, soil 1410 may be gripped between the inner discs 220 and pulled upward as the row unit 10 traverses the field. This result occurs in the embodiment shown in FIG. 16B because soil is compressed as the inner discs 220 first penetrate the soil 1410 at a leading edge and then progressively push the soil farther inward. In the preferred embodiment illustrated in FIG. 16A, the bevel still assists in soil penetration, but does not cause compression in the soil 1410.

Even in embodiments in which distance D is larger (e.g., thirty inches), it is still advantageous for the bevel 222 to face away from the soil contacted by the face of inner disc 220. This is because the sidewall 1430 created by inner disc 220 can become sheared by the increased pressure between the soil and the inner disc if the bevel 222 is oriented toward the soil face 1430.

The outer disc 210 also preferably includes a bevel 212, preferably oriented away from the inner disc 220.

Trench Formation

As the row unit 10 traverses the field, the row unit creates and closes a trench 1500 in the soil 1410 as best illustrated in FIGS. 14A-14C and 15. As the opener disc assembly 200 penetrates the soil 1410, gauge wheel 52 compresses soil adjacent the outer disc 210 while maintaining the proper trench depth. Seed tube assembly 100 preferably includes a fertilizer knife 120 mounted to the seed tube guard 110 and configured to cut a cavity 1440 into the soil adjacent a trough 1405 of the trench 1500.

Figures 14A, 14B, 14C:
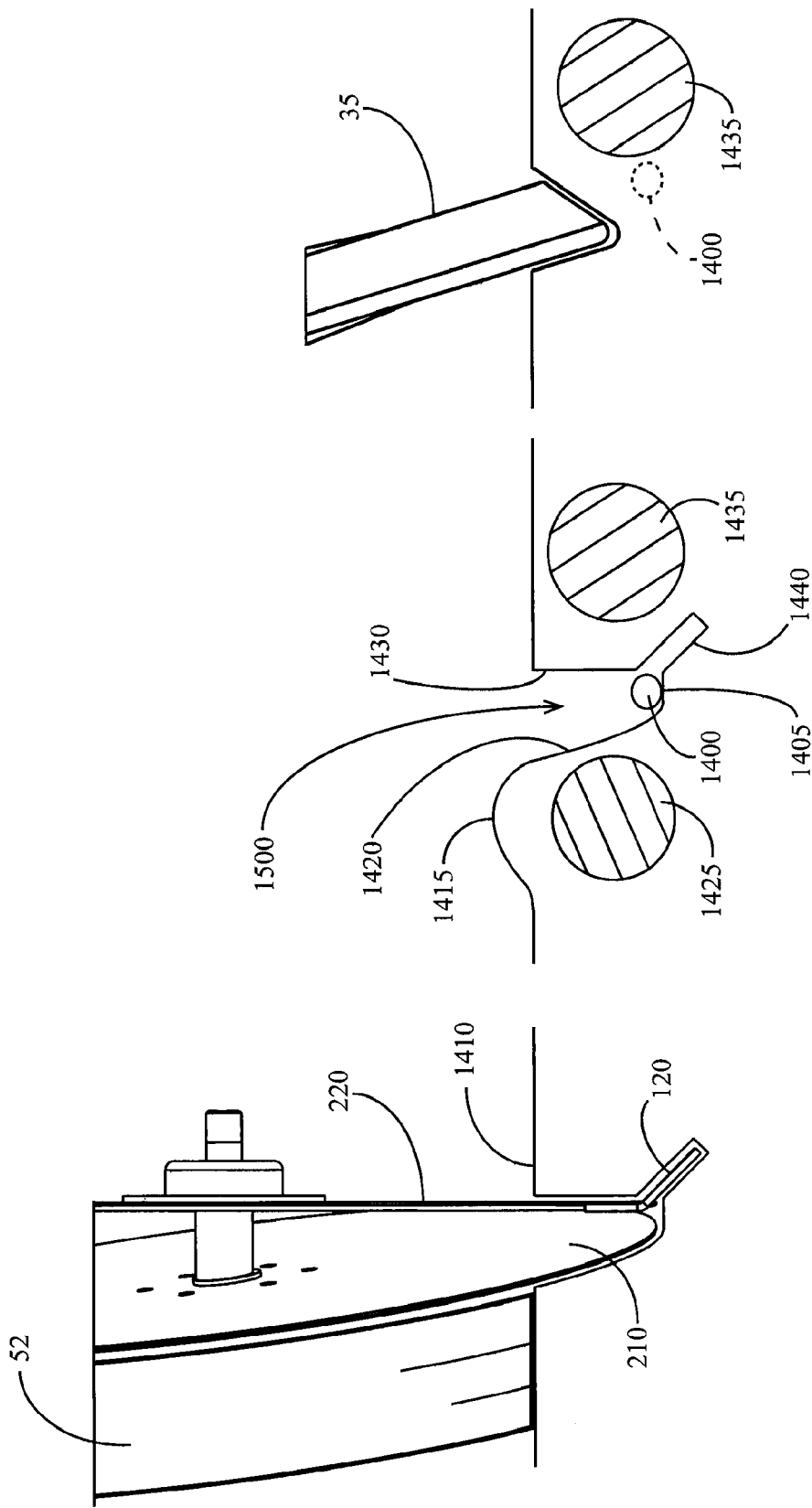
FIG. 14A is a partial rear elevation view of the agricultural row unit of FIG. 1 opening a trench.
FIG. 14B is a rear elevation view of the trench of FIG. 14A.
FIG. 14C is a rear elevation view of the closing wheel of the agricultural row unit of FIG. 1 closing the trench of FIG. 14A.

The trench 1500 created by the opener discs is best illustrated in FIG. 14B. The outer discs 210 create an angled sidewall 1420 in the soil. The inner discs 220 create a substantially vertical sidewall 1430 in the soil. The trench 1500 includes a trough 1405, where a seed 1400 is preferably deposited after the trenched is opened. Excess soil 1415 removed to form the trench 1500 is preferably deposited adjacent the outer disc 210. Soil 1425 adjacent the angled sidewall 1420 is compacted due to the load imposed by gauge wheel 52. Soil 1435 adjacent to the vertical sidewall 1430 is not substantially compacted by the operation of row unit 10. A liquid applicator (not shown) mounted to the seed tube assembly 100 preferably injects fertilizer or other liquid or crop input into or near the cavity 1440 created by the fertilizer knife 120. The cavity 1440 preferably extends into the relatively loose soil 1435 because seedling roots of seed 1400 will tend to grow away from the compacted soil 1425 and toward the relatively loose soil. Thus the fertilizer knife 120 preferably extends downward and away from the outer disc 210.

After the seed 1400 and any liquid fertilizer have been placed, the closing wheel 35 presses all or a portion of the excess soil 1415 back into the trench 1500, covering the seed 1400 as illustrated in FIG. 14C. While the closing wheel 35 further compacts the soil 1425, the soil 1435 adjacent the inner disc 220 remains relatively loose.

Figure 15:
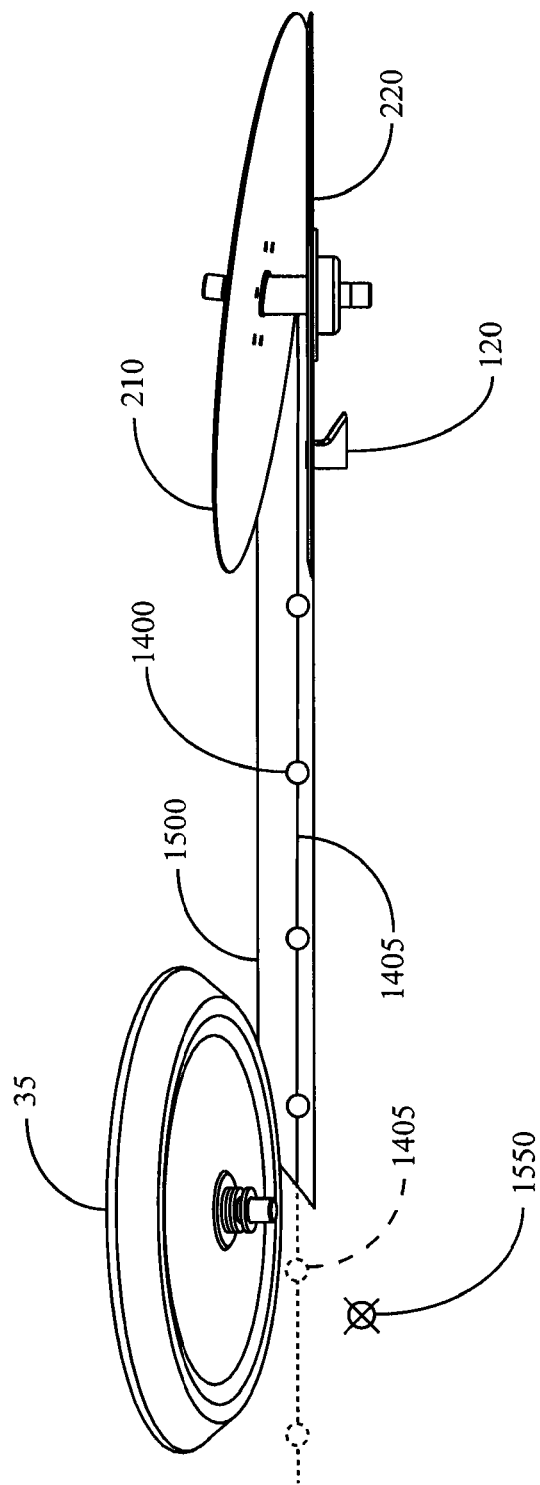
FIG. 15 is a top view of the trench of FIG. 14A being opened and closed by the agricultural row unit of FIG. 1.

Fertilizer or other liquids may be deposited on the soil after the trench is closed as illustrated in FIG. 15. An applicator nozzle 1550 preferably deposits the soil atop the relatively loose soil 1435 because seedling roots of seed 1400 will tend to grow away from the compacted soil 1425 and toward the relatively loose soil. Thus the applicator 1550 is preferably mounted inboard from the inner disc 220, i.e., opposite the outer disc 210 on the closing assembly 30 as illustrated in FIG. 3.

Row Cleaners

Figure 17:
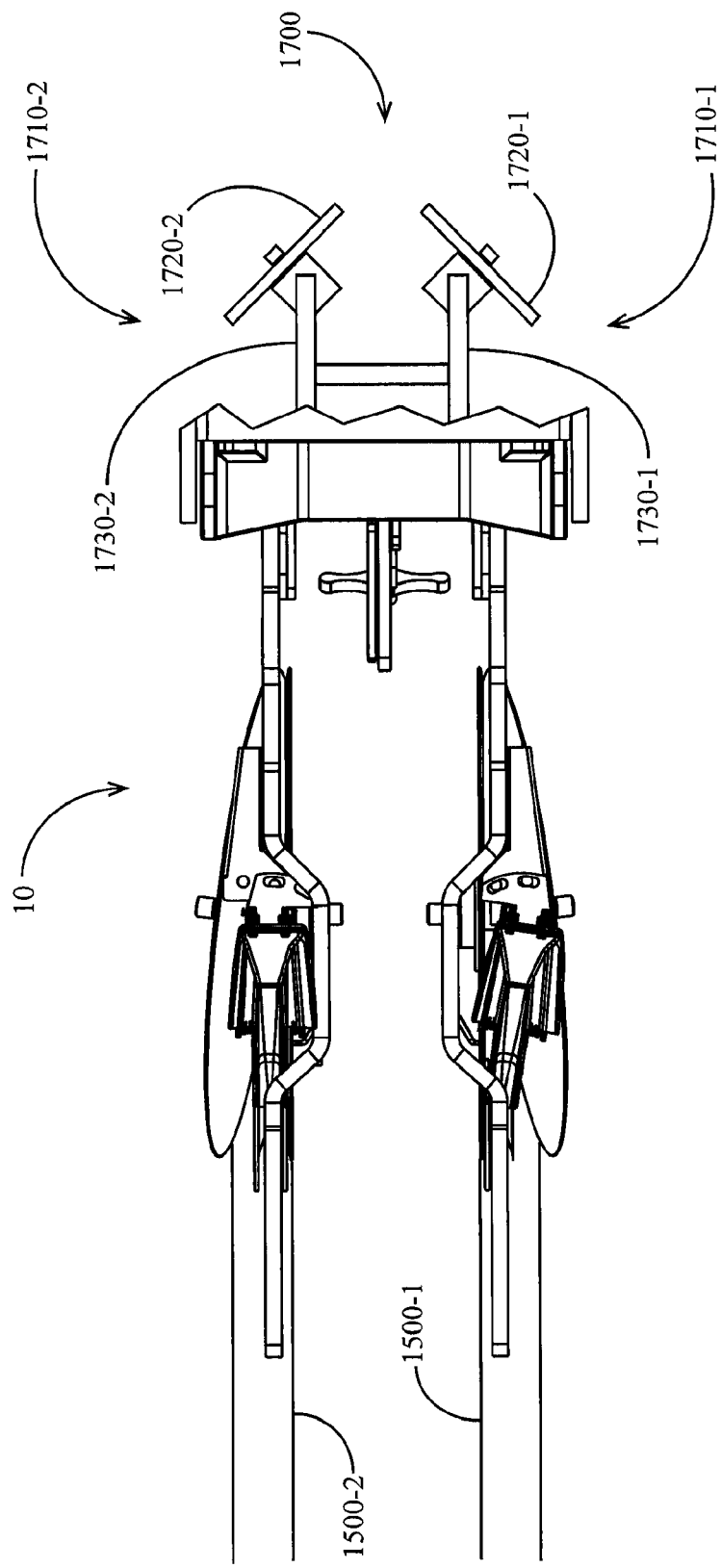
FIG. 17 is a top cutaway view, with some components removed, of yet another embodiment of an agricultural row unit including a row cleaner assembly.

As illustrated in FIG. 17, a row cleaner assembly 1700 may preferably be incorporated into row unit 10. The row cleaner assembly 1700 may include a single row cleaner 1710 leading each opener disc assembly 200. Each row cleaner 1710 preferably comprises a row cleaner arm 1730 having a first end and a second end. The first end of row cleaner arm 1730 is preferably pivotally mounted to the row unit 10 for pivoting about an axis substantially transverse to the direction of travel. A ground-engaging blade 1720 is preferably pivotally mounted to the second end of row cleaner arm 1730. The ground-engaging blade 1720 associated with the row cleaner 1710 is preferably oriented at an angle with respect to the direction of travel and preferably extends across the area to opened by opener disc assemblies 200 in order to clear debris and crop residue from the path of the opener disc assemblies.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural row unit, said row unit comprising:
a first opener disc, said first opener disc being substantially vertically oriented, said first opener disc having a leading edge and a trailing edge; and
a second opener disc disposed to contact a perimeter of said first opener disc, said second opener disc disposed at an offset angle from said first opener disc, wherein the agricultural row unit is configured to travel along a travel direction, wherein said leading edge of said first opener disc lies in a vertical plane substantially parallel to said travel direction, and wherein said trailing edge of said first opener disc lies in said vertical plane.

2. The agricultural row unit of claim 1, wherein said first opener disc includes a bevel at a perimeter of said first opener disc, said bevel oriented toward said second opener disc.

3. The agricultural row unit of claim 1, further including:
a third opener disc, said third opener disc being substantially vertical; and
a fourth opener disc disposed to contact a perimeter of said third opener disc, said fourth opener disc disposed at an offset angle from said third opener disc.

4. The agricultural row unit of claim 3, wherein said third opener disc includes a bevel at a perimeter of said first opener disc, said bevel oriented toward said fourth opener disc.

5. The agricultural row unit of claim 4, wherein said third opener disc includes a bevel at a perimeter of said third opener disc, said bevel oriented toward said fourth opener disc.

6. The agricultural row unit of claim 1, further including:
a seed meter configured to dispense seeds; and
a seed tube disposed beneath said seed meter and disposed to receive seeds from said seed meter, said seed tube disposed between said first opener disc and said second opener disc.

7. The agricultural row unit of claim 1, wherein said first opener disc contacts said second opener disc at a contact area, said contact area being forward of a center of said first opener disc.

8. The agricultural row unit of claim 1, further including:
a first gauge wheel disposed adjacent to said second opener disc opposite said first opener disc.

9. The agricultural row unit of claim 8, further including:
a third opener disc, said third opener disc being substantially vertical;
a fourth opener disc disposed to contact a perimeter of said third opener disc, said fourth opener disc disposed at an offset angle from said third opener disc;
a second gauge wheel disposed adjacent to said fourth opener disc opposite said third opener disc;
a first gauge wheel arm supporting said first gauge wheel, said first gauge wheel arm being pivotally mounted to the row unit;
a second gauge wheel arm supporting said second gauge wheel, said second gauge wheel arm being pivotally mounted to the row unit; and
a rocker pivotally mounted to the row unit and disposed to limit a path of travel of said first gauge wheel arm and said second gauge wheel arm.

10. The agricultural row unit of claim 8, further including:
a closing wheel disposed behind said first gauge wheel and disposed to move soil behind said first gauge wheel toward said first opener disc.

11. The agricultural row unit of claim 1, further including:
a knife disposed adjacent the perimeter of said first opener disc, said knife extending downward and away from said second opener disc.

12. A method of forming a trench in soil, said method comprising:
drawing a first opener disc and a second opener disc through the soil along a travel direction;
creating a vertical sidewall in the soil with a first opener disc; and
cutting an angled sidewall in the soil adjacent to said vertical sidewall with a second opener disc, said vertical sidewall and said angled sidewall defining a trench, said trench having a trough located at an intersection of said vertical sidewall and said angled sidewall, said trough defining a vertical plane parallel to said travel direction, said trench lying substantially between said vertical plane and said angled sidewall.

13. The method of claim 12, wherein said vertical sidewall and said angled sidewall intercept a trough of the trench.

14. The method of claim 12, further including:
setting a depth of the trench by pressing a gauge wheel into soil adjacent said angled sidewall and opposite said vertical sidewall.

15. The method of claim 14, further including:
moving soil located behind said gauge wheel into the trench.

16. The method of claim 12, wherein said first opener disc includes a bevel at a perimeter of said first opener disc, said bevel facing toward said second opener disc.

17. The method of claim 12, further including:
drawing a third opener disc and a fourth opener disc through the soil;
creating a second vertical sidewall in the soil with said third opener disc; and
cutting a second angled sidewall in the soil adjacent to said second vertical sidewall with said fourth opener disc.

18. The method of claim 17, wherein said first opener disc includes a bevel at a perimeter of said first opener disc, said bevel facing said second opener disc, and wherein said third opener disc includes a bevel at a perimeter of said third opener disc, said bevel facing said fourth opener disc.

19. The method of claim 12, further including:
depositing a seed in the trench.

20. The method of claim 12, further including:
cutting a cavity in the soil adjacent to a trough of said trench adjacent to said vertical sidewall, said cavity extending downward and away from said angled sidewall; and
depositing a liquid near said cavity.

* * * * *